(12) United States Patent
Shingler

(10) Patent No.: US 12,114,228 B2
(45) Date of Patent: Oct. 8, 2024

(54) SOCIAL MEDIA SYSTEMS AND METHODS AND MOBILE DEVICES THEREFOR

(71) Applicant: Flying Eye Reality, Inc., St. John, IN (US)

(72) Inventor: Raymond Charles Shingler, Valparaiso, IN (US)

(73) Assignee: Flying Eye Reality, Inc., St. John, IN (US)

( * ) Notice: Subject to any disclaimer, the term of this patent is extended or adjusted under 35 U.S.C. 154(b) by 0 days.

(21) Appl. No.: 18/356,763

(22) Filed: Jul. 21, 2023

(65) Prior Publication Data

US 2023/0370811 A1    Nov. 16, 2023

Related U.S. Application Data

(63) Continuation of application No. 17/166,679, filed on Feb. 3, 2021, which is a continuation of application No. 16/989,713, filed on Aug. 10, 2020, now Pat. No. 10,945,094, which is a continuation of application
(Continued)

(51) Int. Cl.
| | |
|---|---|
| *H04W 4/00* | (2018.01) |
| *G06F 3/04817* | (2022.01) |
| *G06F 3/0482* | (2013.01) |
| *G06Q 50/00* | (2012.01) |
| *H04N 23/62* | (2023.01) |
| *H04N 23/63* | (2023.01) |
| *H04W 4/02* | (2018.01) |
| *H04W 4/08* | (2009.01) |
| *G06F 3/14* | (2006.01) |

(52) U.S. Cl.
CPC ........ *H04W 4/023* (2013.01); *G06F 3/04817* (2013.01); *G06F 3/0482* (2013.01); *G06Q 50/01* (2013.01); *H04N 23/62* (2023.01); *H04N 23/63* (2023.01); *H04W 4/08* (2013.01); *G06F 3/14* (2013.01)

(58) Field of Classification Search
CPC ........... H04W 4/023; H04W 4/08; G06F 3/14; G06F 3/0482
See application file for complete search history.

(56) References Cited

U.S. PATENT DOCUMENTS

| | | |
|---|---|---|
| 9,351,118 B2 | 5/2016 | Crutchfield |
| 9,530,059 B2 | 12/2016 | Zises |
| 9,645,221 B1 | 5/2017 | Heizer |

(Continued)

FOREIGN PATENT DOCUMENTS

WO   PCT/US24/11441   4/2024

OTHER PUBLICATIONS

Hile, H. et al., "Landmark-Based Pedestrian Navigation from Collections of Geotagged Photos", Research Gate-Conference Paper (2008), publication at: https://www.researchgate.net/publication/221342528 (10 pages).

(Continued)

*Primary Examiner* — Omoniyi Obayanju
(74) *Attorney, Agent, or Firm* — Birch Tree IP Law & Strategy PLLC; Jamie T. Gallagher

(57) ABSTRACT

Methods, systems, and mobile devices for providing users with social media-related information about other users based on the relative geographic locations of the users.

41 Claims, 10 Drawing Sheets
(8 of 10 Drawing Sheet(s) Filed in Color)

Related U.S. Application Data

No. 15/696,803, filed on Sep. 6, 2017, now Pat. No. 10,743,131.

(60) Provisional application No. 62/383,813, filed on Sep. 6, 2016.

(56) References Cited

U.S. PATENT DOCUMENTS

| | | |
|---|---|---|
| 9,743,244 B2 | 8/2017 | Crutchfield |
| 10,108,859 B1 | 10/2018 | Suiter et al. |
| 10,223,738 B1 | 3/2019 | Suiter et al. |
| 10,257,649 B2 | 4/2019 | Crutchfield et al. |
| 10,334,134 B1 | 6/2019 | Suiter et al. |
| 10,402,650 B1 | 9/2019 | Suiter et al. |
| 10,638,256 B1 | 4/2020 | Suiter |
| 10,743,131 B2 | 8/2020 | Shingler |
| 10,805,696 B1 | 10/2020 | Suiter et al. |
| 10,839,219 B1 | 11/2020 | Suiter et al. |
| 10,848,909 B1 | 11/2020 | Shingler |
| 10,945,094 B2 | 3/2021 | Shingler |
| 10,992,836 B2 | 4/2021 | Suiter et al. |
| 11,026,046 B2 | 6/2021 | Crutchfield et al. |
| 11,044,393 B1 | 6/2021 | Suiter et al. |
| 11,528,580 B2 | 12/2022 | Shingler |
| 11,533,585 B2 | 12/2022 | Shingler |
| 11,653,176 B2 | 5/2023 | Shingler |
| 2007/0125861 A1 | 6/2007 | Shoobridge |
| 2008/0051033 A1 | 2/2008 | Hymes |
| 2008/0268876 A1 | 10/2008 | Gelfand et al. |
| 2013/0043302 A1 | 2/2013 | Powlen et al. |
| 2013/0066964 A1 | 3/2013 | Odio et al. |
| 2014/0236468 A1 | 8/2014 | Dave et al. |
| 2015/0178993 A1* | 6/2015 | Skarulis ............... G06F 3/147 |
| | | 345/633 |
| 2015/0206349 A1 | 7/2015 | Rosenthal et al. |
| 2015/0296340 A1 | 10/2015 | Crutchfield |
| 2016/0132912 A1 | 5/2016 | Beggy et al. |
| 2016/0171305 A1 | 6/2016 | Zises |
| 2016/0203352 A1 | 7/2016 | Marsico |
| 2016/0234643 A1* | 8/2016 | Crutchfield ........... H04W 4/029 |
| 2017/0359690 A1 | 12/2017 | Crutchfield et al. |
| 2018/0069817 A1 | 3/2018 | Constantinides |
| 2018/0070206 A1 | 3/2018 | Shingler |
| 2019/0246238 A1 | 8/2019 | Crutchfield et al. |
| 2019/0312990 A1 | 10/2019 | Suiter et al. |
| 2020/0193717 A1 | 6/2020 | Daly |
| 2020/0374652 A1 | 11/2020 | Shingler |
| 2020/0374654 A1 | 11/2020 | Shingler |
| 2021/0081033 A1 | 3/2021 | Gaconnier |
| 2021/0160657 A1 | 5/2021 | Shingler |
| 2021/0185479 A1 | 6/2021 | Shingler |
| 2021/0195371 A1 | 6/2021 | Shingler |
| 2021/0405959 A1 | 12/2021 | Lovitt |
| 2022/0279309 A1 | 9/2022 | Shingler |
| 2023/0030094 A1 | 2/2023 | Shingler |
| 2023/0031740 A1 | 2/2023 | Shingler |
| 2023/0033210 A1 | 2/2023 | Shingler |
| 2023/0353976 A1 | 11/2023 | Shingler |
| 2023/0362584 A1 | 11/2023 | Shingler |
| 2023/0362585 A1 | 11/2023 | Shingler |
| 2023/0362586 A1 | 11/2023 | Shingler |
| 2023/0370811 A1 | 11/2023 | Shingler |
| 2024/0022871 A1 | 1/2024 | Shingler |

OTHER PUBLICATIONS

U.S. Appl. No. 15/696,803, Feb. 7, 2019, Office Action, U.S. Pat. No. 10,743,131.
U.S. Appl. No. 15/696,803, May 6, 2019, Response to Office Action, U.S. Pat. No. 10,743,131.
U.S. Appl. No. 15/696,803, Aug. 7, 2019, Office Action (Final), U.S. Pat. No. 10,743,131.
U.S. Appl. No. 15/696,803, Oct. 30, 2019, Response to Office Action, U.S. Pat. No. 10,743,131.
U.S. Appl. No. 15/696,803, Nov. 6, 2019, Advisory Action, U.S. Pat. No. 10,743,131.
U.S. Appl. No. 15/696,803, Dec. 27, 2019, Supplemental Amendment, U.S. Pat. No. 10,743,131.
U.S. Appl. No. 15/696,803, Jan. 21, 2020, Office Action, U.S. Pat. No. 10,743,131.
U.S. Appl. No. 15/696,803, May 21, 2020, Response to Office Action, U.S. Pat. No. 10,743,131.
U.S. Appl. No. 15/696,803, Jul. 1, 2020, Notice of Allowance, U.S. Pat. No. 10,743,131.
U.S. Appl. No. 15/696,803, Jul. 1, 2020, Examiner Initiated Interview Summary, U.S. Pat. No. 10,743,131.
U.S. Appl. No. 15/696,803, Jul. 22, 2020, Issue Notification, U.S. Pat. No. 10,743,131.
U.S. Appl. No. 16/989,348, Sep. 23, 2020, Notice of Allowance, U.S. Pat. No. 10,848,909.
U.S. Appl. No. 16/989,348, Nov. 4, 2020, Issue Notification, U.S. Pat. No. 10,848,909.
U.S. Appl. No. 16/989,713, Sep. 24, 2020, Office Action, U.S. Pat. No. 10,945,094.
U.S. Appl. No. 16/989,713, Nov. 25, 2020, Response to Office Action, U.S. Pat. No. 10,945,094.
U.S. Appl. No. 16/989,713, Dec. 8, 2020, Notice of Allowance, U.S. Pat. No. 10,945,094.
U.S. Appl. No. 16/989,713, Feb. 17, 2021, Issue Notification, U.S. Pat. No. 10,945,094.
U.S. Appl. No. 17/166,679, Dec. 23, 2022, Office Action.
U.S. Appl. No. 17/166,679, Apr. 24, 2023, Response to Office Action.
U.S. Appl. No. 17/166,679, May 8, 2023, Office Action (Final).
U.S. Appl. No. 17/166,679, Jun. 25, 2023, Response to Office Action.
U.S. Appl. No. 17/166,679, Aug. 3, 2023, Advisory Action.
U.S. Appl. No. 17/166,679, Dec. 1, 2023, Office Action.
U.S. Appl. No. 17/166,679, May 1, 2024, Response to Office Action.
U.S. Appl. No. 17/166,679, May 20, 2024, Office Action (Final).
U.S. Appl. No. 17/186,265, Sep. 1, 2022, Notice of Allowance, U.S. Pat. No. 11,533,585.
U.S. Appl. No. 17/186,265, Sep. 1, 2022, Examiner Initiated Interview Summary, U.S. Pat. No. 11,533,585.
U.S. Appl. No. 17/186,265, Sep. 12, 2022, Notice of Allowability and Examiner Amendment, U.S. Pat. No. 11,533,585.
U.S. Appl. No. 17/186,265, Sep. 23, 2022, Rule 312 Amendment, U.S. Pat. No. 11,533,585.
U.S. Appl. No. 17/186,265, Oct. 3, 2022, Reply to 312 Amendment, U.S. Pat. No. 11,533,585.
U.S. Appl. No. 17/186,265, Nov. 30, 2022, Issue Notification, U.S. Pat. No. 11,533,585.
U.S. Appl. No. 17/197,808, Sep. 1, 2022, Notice of Allowance, U.S. Pat. No. 11,528,580.
U.S. Appl. No. 17/197,808, Sep. 1, 2022, Examiner Initiated Interview Summary, U.S. Pat. No. 11,528,580.
U.S. Appl. No. 17/197,808, Sep. 23, 2022, Rule 312 Amendment, U.S. Pat. No. 11,528,580.
U.S. Appl. No. 17/197,808, Oct. 26, 2022, Reply to 312 Amendment, U.S. Pat. No. 11,528,580.
U.S. Appl. No. 17/197,808, Nov. 22, 2022, Issue Notificaiton, U.S. Pat. No. 11,528,580.
U.S. Appl. No. 17/206,218, Jan. 13, 2023, Notice of Allowance, U.S. Pat. No. 11,653,176.
U.S. Appl. No. 17/206,218, Jan. 13, 2023, Examiner Initiated Interview Summary, U.S. Pat. No. 11,653,176.
U.S. Appl. No. 17/206,218, Apr. 26, 2023, Issue Notification, U.S. Pat. No. 11,653,176.
U.S. Appl. No. 17/966,793, Jun. 8, 2023, Office Action.
U.S. Appl. No. 17/966,793, Nov. 8, 2023, Response to Office Action.
U.S. Appl. No. 17/966,793, Mar. 19, 2024, Office Action (Final).
U.S. Appl. No. 17/966,845, Feb. 1, 2024, Office Action.
U.S. Appl. No. 17/966,845, May 1, 2024, Response to Office Action.

(56) References Cited

OTHER PUBLICATIONS

U.S. Appl. No. 17/966,845, May 20, 2024, Notice of Allowance.
U.S. Appl. No. 17/966,846, Feb. 1, 2024, Office Action.
U.S. Appl. No. 17/966,846, May 1, 2024, Response to Office Action.
U.S. Appl. No. 17/966,846, May 15, 2024, Notice of Allowance.
U.S. Appl. No. 18/356,686, Jun. 4, 2024, Office Action.
U.S. Appl. No. 18/356,686, Jun. 6, 2024, Response to Office Action.
U.S. Appl. No. 15/696,803, filed Sep. 6, 2017, U.S. Pat. No. 10,743,131.
U.S. Appl. No. 16/989,348, filed Aug. 10, 2020, U.S. Pat. No. 10,848,909.
U.S. Appl. No. 16/989,713, filed Aug. 10, 2020, U.S. Pat. No. 10,945,094.
U.S. Appl. No. 17/166,679, filed Feb. 3, 2021.
U.S. Appl. No. 17/186,265, filed Feb. 26, 2021, U.S. Pat. No. 11,633,585.
U.S. Appl. No. 17/197,808, filed Mar. 10, 2021, U.S. Pat. No. 11,528,580.
U.S. Appl. No. 17/206,218, filed Mar. 19, 2021, U.S. Pat. No. 11,653,176.
U.S. Appl. No. 17/966,793, filed Oct. 15, 2022.
U.S. Appl. No. 17/966,845, filed Oct. 16, 2022.
U.S. Appl. No. 17/966,846, filed Oct. 16, 2022.
U.S. Appl. No. 18/356,686, filed Jul. 21, 2023.
U.S. Appl. No. 18/356,717, filed Jul. 21, 2023.
U.S. Appl. No. 18/356,740, filed Jul. 21, 2023.
U.S. Appl. No. 18/356,748, filed Jul. 21, 2023.
U.S. Appl. No. 18/356,763, filed Jul. 21, 2023.
U.S. Appl. No. 18/356,775, filed Jul. 21, 2023.
U.S. Appl. No. 18/344,678, filed Jun. 29, 2023.
U.S. Appl. No. 18/412,023, filed Jan. 12, 2024.
U.S. Appl. No. 18/706,331, filed Apr. 30, 2024.
U.S. Appl. No. 18/651,378, filed Apr. 30, 2024.
U.S. Appl. No. 18/651,395, filed Apr. 30, 2024.
U.S. Appl. No. 18/356,686, filed Jun. 26, 2024, Notice of Allowance.
U.S. Appl. No. 18/356,748, filed Jul. 2, 2024, Notice of Allowance.
U.S. Appl. No. 18/356,763, filed Jul. 1, 2024, Notice of Allowance.

* cited by examiner

FIG. 8

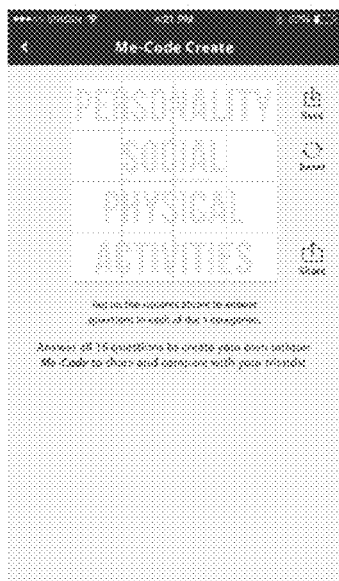

1. Initial screen at start

FIG. 9

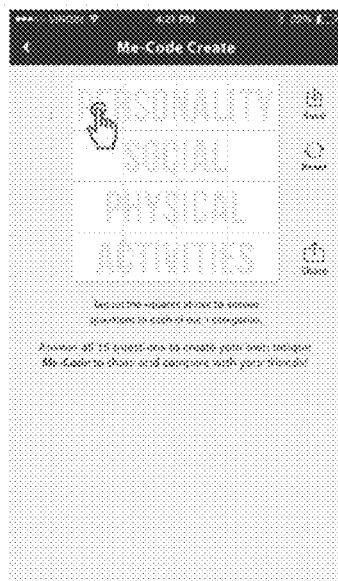

2. Tap any one of the 16 squares in the grid to pop-up the question that is associated with that particular square.

In the graphic above, the person is tapping on the 1st square in the personality row (see green hand).

FIG. 10

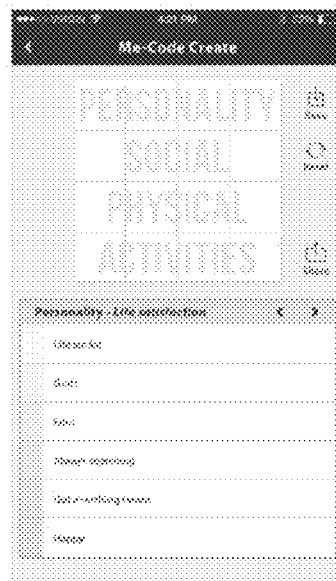

3. After the tap, a question for that square will pop-up along with 6 answers that each have their own shade of color assigned to them. The 6 shades of color are from a gradient of a particular color. In the example above it is yellow.

FIG. 11

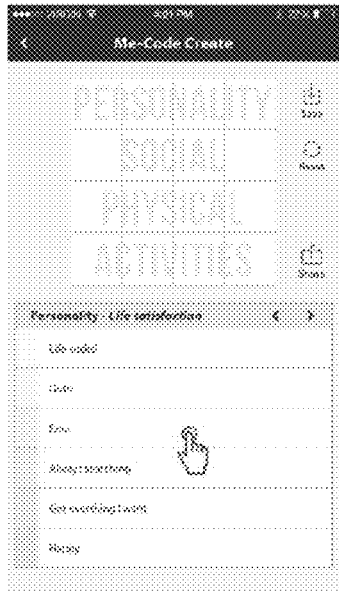

4. The user now selects an answer that best describes their current state of *Life Satisfaction* by tapping on the answer (see green hand).

FIG. 12

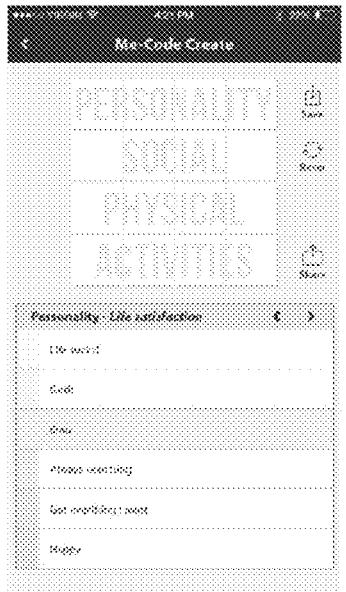

5. After the system receives the tap it changes the whole line from white to the color associated with color chip that was visible on the far left side of the answer.

FIG. 13

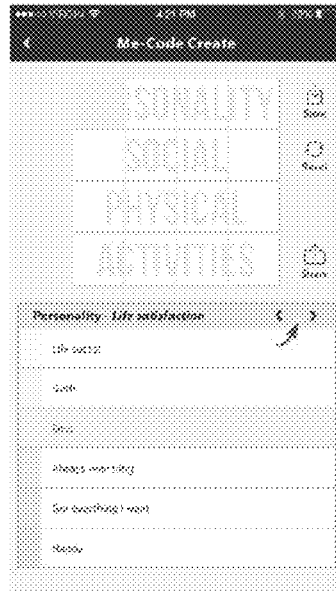

6. Almost instantly after the answer is selected, the associated square above also turns to the same color chip of the answer selected below.

FIG. 14

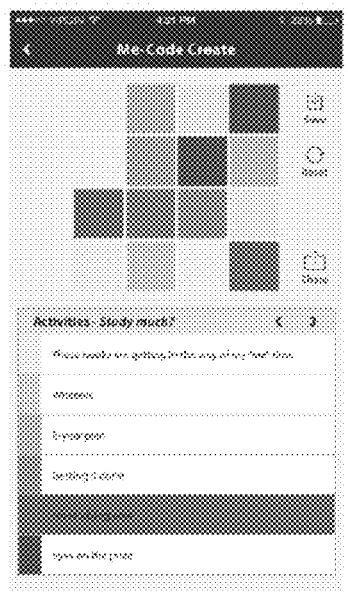

7. This is done for each of the remaining 15 squares in the grid. Users can go in any order by tapping any square they want. They can also cycle through the questions by tapping either the less than or greater than characters that are located to the right of the category and question line (see green arrow).

They can change their answers by simply tapping on the square again to pop-up that question to select another answer, changing the color chip shade.

8. Once all 16 questions are answered a user can *Share* their code with other friends in the *TeepeedU* platform (see graphic on the right).

They can also create a Me-Code of a person they are interested in searching for.

The system will return a list of people that match based on the highest percentage amount matched first.

Users can *Reset* their code to default white and start over again.

| Personality – *Emotional baggage* ‹ › |
|---|
| Free & clear |
| I'm mellow |
| Small carry-on |
| Everyone has baggage, Right? |
| Enough issues for a magazine rack |
| None of your business! |

FIG. 18

| Social – *Looking for sex* ‹ › |
|---|
| Nun |
| Waiting for the right one |
| Waiting till after I'm married |
| Maybe when I know you better |
| I'll be right over Baby |
| DTF |

FIG. 19

| Physical – *Body Type* ‹ › |
|---|
| Pixie |
| Ballerina |
| Normal |
| Are those real? |
| Athletic |
| Big and proud |

FIG. 20

| Activities – *Charity Work* ‹ › |
|---|
| Too busy with my own problems |
| Ain't nobody got time for that |
| When someone needs me |
| Every now and then |
| Superhero volunteer |
| Mother Teresa |

FIG. 21

SOCIAL MEDIA SYSTEMS AND METHODS AND MOBILE DEVICES THEREFOR

RELATED APPLICATION DATA

This application is a continuation application of U.S. patent application Ser. No. 17/166,679 (U.S. Patent Application Publication No. 2021/0160657, published on May 27, 2021), filed Feb. 3, 2021, entitled "Social Media Systems and Methods and Mobile Devices Therefor," which is a continuation application of U.S. patent application Ser. No. 16/989,713, filed Oct. 10, 2020, entitled "Social Media Systems and Methods and Mobile Devices Therefor" which is now U.S. Pat. No. 10,945,094 (issued Mar. 9, 2021), which is a continuation application of U.S. patent application Ser. No. 15/696,803, filed Sep. 6, 2017, entitled "Social Media Systems and Methods and Mobile Devices Therefor" which is now U.S. Pat. No. 10,743,131 (issued Aug. 11, 2020), each of which are incorporated by reference herein in their entirety. This application also claims the benefit of priority of U.S. Provisional patent application Ser. No. 62/383,813, filed Sep. 6, 2016, entitled "Social Media Systems and Method," which application is incorporated by reference herein in its entirety.

This application is also related to U.S. patent application Ser. No. 16/989,348, filed on Aug. 10, 2020, entitled "Social Media Systems and Methods and Mobile Devices Therefor" which is now U.S. Pat. No. 10,848,909 (issued Nov. 24, 2020); U.S. patent application Ser. No. 17/186,265, filed on Feb. 26, 2021, entitled "Social Media Systems and Methods and Mobile Devices Therefor" which is now U.S. Pat. No. 11,533,585 (issued Dec. 20, 2022); U.S. patent application Ser. No. 17/197,808, filed on Mar. 10, 2021, entitled "Social Media Systems and Methods and Mobile Devices Therefor" which is now U.S. Pat. No. 11,528,580 (issued Dec. 13, 2022); U.S. patent application Ser. No. 17/206,218, filed on Mar. 19, 2021, entitled "Social Media Systems and Methods and Mobile Devices Therefor" which is now U.S. Pat. No. 11,653,176 (issued May 16, 2023); U.S. patent application Ser. No. 17/996,793, filed on Oct. 15, 2022, entitled "Social Media Systems and Methods and Mobile Devices Therefor," which is published as U.S. Application Publication No. 2023/0030094 (published Feb. 2, 2023); U.S. patent application Ser. No. 17/996,845, filed on Oct. 16, 2022, entitled "Social Media Systems and Methods and Mobile Devices Therefor," which is published as U.S. Application Publication No. 2023/0031740 (published Feb. 2, 2023); U.S. patent application Ser. No. 17/996,846, filed on Oct. 16, 2022, entitled "Social Media Systems and Methods and Mobile Devices Therefor," which is published as U.S. Application Publication No. 2023/0033210 (published Feb. 2, 2023); and U.S. patent application Ser. No. 18/344,678, filed on Jun. 29, 2023, entitled "Social Media Systems and Methods and Mobile Devices Therefor," each of which is incorporated by reference herein in its entirety.

BACKGROUND

The present invention generally relates to social media platforms, systems, and methods. The invention particularly relates to a system utilizing handheld electronic mobile devices and application software (app) running thereon to enable a user thereof to initiate direct person-to-person communications and social interactions with other users who are physically or virtually located within the physical vicinity of the initiating user, but with whom the initiating user may be unacquainted.

Various social media tools, such as websites and mobile apps, are available that provide users with the capability of exchanging information, particularly user generated content such as text, digital photo, or digital video posts. An example is disclosed in U.S. Pat. No. 9,743,244 to Crutchfield. Commonly, such tools allow users to create their own profiles, which is included in an online social network that connects the user's profile with those of other individuals and/or groups. Such tools generally promote interactions between the users within the network, such as commenting on other user's content, joining virtual groups, and the like. While these capabilities are beneficial for users to remain in contact with other users that they are already acquainted with, the tools may be limited in their ability to connect and exchange information between users that are strangers or otherwise not yet socially acquainted. As such, it would be desirable if a system were available for selectively providing a user with social media-related information about other users with whom they are unacquainted to promote direct person-to-person communications and social interactions.

SUMMARY OF THE DISCLOSURE

The present invention provides methods and systems suitable for selectively providing a user with social media-related information about other users based on the geographic location of the user relative to the other users.

In one implementation, a method of interacting in a social media platform is provided. The method includes receiving from a first user of a social media platform a pinning of a first image of the first user's digital self to a first geographic location via a first user interface displayed to the first user on a first mobile device; securing a spot of an area near the pinning of the first image as a GPS located crib for the first user; receiving from the first user a pinning of a second image representing other non-personal profile user-generated content of the first user to the GPS located crib; and providing a second user interface to a second user of the social media platform when the second user is physically located at the first geographic location, the second user interface including an augmented reality display of the first image and the second image each superimposed over an image of a real-world environment of the first geographic location, the image of the real-world environment obtained via a camera of a second mobile device of the second user, the first image and the second image being accessible by the second user only when the second user is within the physical vicinity of the first geographic location, the display of the first image providing access to the second user to a personal profile of the first user, the display of the second image providing access to the second user to a separate display of the user-generated content represented by the second image.

In another implementation, a method of interacting in a social media platform is provided. The method includes receiving from a first user of a social media platform a pinning of a first image of the first user's digital self to a first geographic location via a first user interface displayed to the first user on a first mobile device; securing a spot of an area near the pinning of the first image as a GPS located crib for the first user; receiving from the first user a pinning of a second image representing other non-personal profile user-generated content of the first user to the GPS located crib; and providing a second user interface to a second user of the social media platform when the second user is physically located at the first geographic location, the second user interface including an augmented reality display of the first image and the second image each superimposed over an image of a real-world environment of the first geographic location, the image of the real-world environment obtained via a camera of a second mobile device of the second user, the first image and the second image being accessible by the second user only when the second user is within the physical vicinity of the first geographic location, the display of the first image providing access to the second user to a personal profile of the first user, the display of the second image providing access to the second user to a separate display of the user-generated content represented by the second image, wherein the display of the first image and the second image to the second user is allowed based on a matching of a representation of the first user's personality to a representation of the second user's personality.

In yet another implementation, a method of interacting in a social media platform is provided. The method includes receiving from a first user of a social media platform a pinning of a first image of the first user's digital self to a first geographic location via a first user interface displayed to the first user on a first mobile device, wherein the first user is a member of a university and the first geographic location is on a university campus; securing a spot of an area near the pinning of the first image as a GPS located crib on campus for the first user; receiving from the first user a pinning of a second image representing other non-personal profile user-generated content of the first user to the GPS located crib; providing a second user interface to a second user of the social media platform when the second user is physically located at the first geographic location, the second user interface including an augmented reality display of the first image and the second image each superimposed over an image of a real-world environment of the first geographic location, the image of the real-world environment obtained via a camera of a second mobile device of the second user, the first image and the second image being accessible by the second user only when the second user is within the physical vicinity of the first geographic location, the display of the first image providing access to the second user to a personal profile of the first user, the display of the second image providing access to the second user to a separate display of the user-generated content represented by the second image, wherein the display of the first image and the second image to the second user is allowed based on a matching of a representation of the first user's personality to a representation of the second user's personality; allowing the second user to access the personal profile of the first user; and allowing the second user to access the separate display of the user-generated content represented by the second image.

According to one aspect of the invention, a social media system and method are provided that include the use of mobile devices to provide the capability for a plurality of individuals to communicate through a location-based augmented reality feature of an app that is stored and operating on the mobile devices.

Another aspect of the invention is a mobile device on which the app and its location-based augmented reality feature are stored and operating as described above.

Still another aspect of the invention includes providing for a first user of a social media system to pin user content to a specific geographic location using a location-based augmented reality feature of an app that is stored and operating on a mobile device of the first user, and allowing a second user of the social media system to access the user content through the location-based augmented reality feature of the app that is also stored and operating on a mobile device of the second user.

Yet another aspect of the invention includes identifying a first user of a social media system with a location-based augmented reality feature of an app that is stored and operating on a mobile device of a second user of the social media system, and then with the app providing the second user access to user content created by the first user.

Technical effects of the methods and systems described above preferably include the capability of a first individual to quickly access limited user content about another individual who is physically or virtually located within the physical vicinity of the first individual's present geographic location, thereby promoting direct person-to-person communications and social interactions between individuals.

Other aspects and advantages of this invention will be further appreciated from the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 8 through 14 represent the display of the mobile device of FIG. 1 showing steps that may be taken by a user to create "Me-Code" user content in accordance with a nonlimiting embodiment of the invention.

FIGS. 15 through 21 illustrate an example of displays related to building a "Me-Code" with questions from categories.

DETAILED DESCRIPTION

Figure 1:
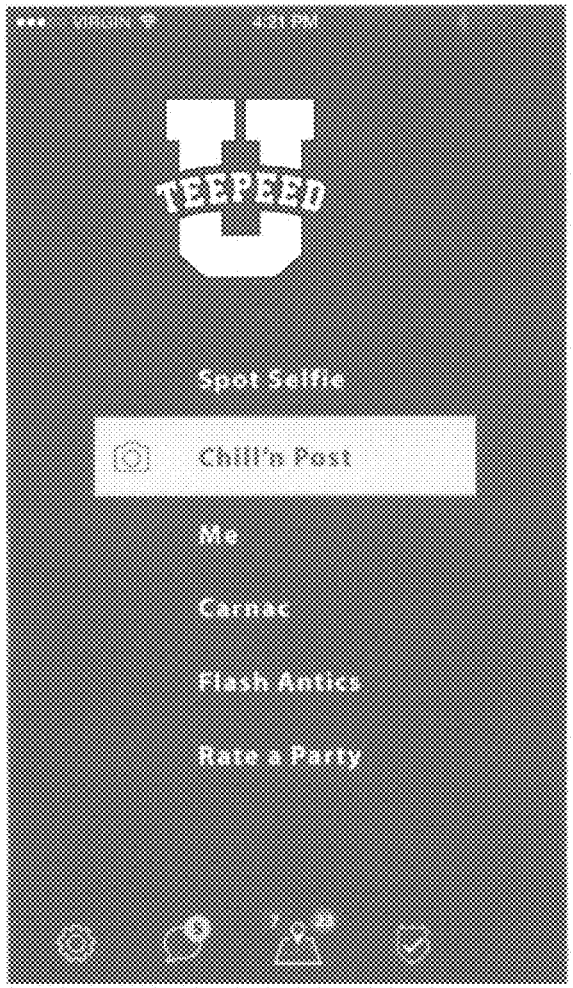
FIG. 1 represents a main menu displayed on a display of a handheld electronic mobile device (cellular phone) by a computer application software (app) operating on the mobile device, wherein various features of the app are displayed on the mobile device in accordance with a nonlimiting embodiment of the invention.

FIGS. 1 through 14 represent images displayed on a display of a handheld electronic mobile device (in the example, a cellular phone) by a computer application software ("app") operating on the mobile device. As used herein, the term "mobile device" refers to any handheld electronic device capable of wirelessly communicating across a mobile network. For this purpose, such a mobile device will typically comprise volatile and nonvolatile (non transitory) memory (processor readable media), a processor for executing processor executable instructions stored on the nonvolatile memory, an input device, a display, a camera, a location device, and a transceiver, and have the ability to generate an output, transmit the output to the mobile network via the transceiver, and receive signals from the mobile network via the transceiver. Current examples of mobile devices include, but are not limited to, cellular telephones, smart phones, tablets, personal digital assistants (PDAs), portable computers, etc. Processors, memory, transceivers, input devices, displays, cameras, and location devices capable of use in mobiles devices encompass a wide variety of electronic devices known in the art as well as those yet to be developed. Memory used in mobile devices of interest serve to store apps, operating systems, software, and/or logic, including the app operating on the mobile device represented in FIGS. 1 through 14. In this regard, processor executable instructions of the app are stored in the nonvolatile memory of the mobile device so that, when executed by a processor, the mobile device performs operations described below in reference to FIGS. 1 through 14. Input devices used in mobile devices of interest typically comprise a physical or screen-generated keyboard. Location devices commonly found in mobile devices of interest are typically GPS (Global Positioning System) receivers, though other geolocation technologies are foreseeable. Transceivers used in mobile devices of interest include but are not limited to cellular, GPRS, Bluetooth, and Wi Fi transceivers.

The mobile device represented in FIGS. 1 through 14 utilizes its transceiver to communicate with a mobile network, which in combination with the app operating on the mobile device provide or otherwise perform as a social media tool (hereinafter, "tool") configured to promote the communication and exchange of information between multiple users of the app based on their actual physical locations ("user locations") as established by the geographic locations of the mobile devices of the users, or their virtual locations ("pinned locations," as described herein below), both of which can be detected by cameras and location devices associated with their mobile devices. Although the tool is described here in reference to certain images displayed by the app operating on a cellular phone as shown in the drawings, it should be understood that the tool and its app may display additional or other images and thereby have additional or other visual appearances. Furthermore, the tool may utilize additional devices and their features, such as but not limited to servers, databases, wireless communication devices, GPS location device, etc., within the mobile network.

According to a particular aspect of the invention, the tool allows each of its users to generate user-generated content ("user content") that includes, but is not limited to, a personal profile containing limited personal information about themselves. Such user content may then be selectively accessible (based on privacy settings set by the user) by other users of the tool via a location-based augmented reality feature of the app, but only when the other users are within the physical vicinity (geographic area) of the user location of the user that created the user content, and/or within the physical vicinity (geographic area) of a pinned location that the user that created the user content has associated with their user content. As used herein, a pinned location means a geographic location that has been selected by the user and to which an image has been "pinned" by the user as a virtual object (hereinafter, "pinned image"), such that the user is present as a virtual object at the pinned location, but is not physically present at the pinned location. In this manner, the tool provides a social media platform by which direct person-to-person communications and social interactions can be initiated by a user (hereinafter, "initiating user") of the system with another user (hereinafter, "recipient user") of the system, but only if the initiating user is within the physical vicinity of the geographic location of the user location of the recipient user, and/or the pinned location of a pinned image of the recipient user. Conversely, such communications and interactions can only be initiated between the initiating user and a recipient user if the user location of the recipient user and/or a pinned location of the recipient user is within the physical vicinity of the geographic location of the initiating user. Detection of the recipient user or a pinned image of the recipient user can be performed with the camera of the initiating user's mobile device, operating in combination with the location-based augmented reality feature of the app to indicate the physical presence of the recipient user or virtual presence (via a pinned image) of the recipient user. The process of discovering potential recipient users is initiated by the initiating user scanning their surroundings with the camera of their mobile device. If a pinned image is detected with the camera, the location-based augmented reality feature displays the pinned image of the recipient user on the display of the mobile device of the initiating user, with the pinned image being overlaid on the image of the real world captured by the camera. If an individual that appears in the scan of the camera is a user of the tool (i.e., a recipient user), the location-based augmented reality feature displays a suitable notification on the display of the mobile device of the initiating user, for example, a dot or other icon that appears above the head of the recipient user. The initiating user effectively initiates communications and interactions with the recipient user by then using the app to access the user content of the recipient user, for example, by clicking on an icon that the app associates with the recipient user and is shown on the display of the initiating user's mobile device, as nonlimiting examples, the pinned image if the recipient user is virtually present or an icon appearing above the head of the recipient user if the recipient user is physically present. Notably, the initiating user is not required to be acquainted with the receipt user in order to access the recipient user's user content. On the other hand, the tool does not provide any notifications regarding individuals that are not users of the tool, in which case there is no user content to be accessed. Furthermore, the privacy settings of the tool set by users enable any user to choose to be completely undetectable by the tool or choose to partially or completely block access to their user content by individuals or everyone, as may be appropriate under certain social circumstances. Furthermore, the app preferably enables all users to select the distance over which they may (as an initiating user) detect other users and over which other users may detect them (as a recipient user).

FIG. 1 represents a menu that provides a user with access to various features of the app. Such features may be generalized to a variety of users, or may be directed to a predetermined group of users. For example, FIGS. 1 through 14 represent a version of the app that is identified as "TeepeedU" and generally intended to be of interest to users who are members of a university, and therefore may be equipped with certain features that may be particularly relevant to their interests. As nonlimiting examples, the menu in FIG. 1 includes features labeled as "Spot Selfie," "Chill'n Post," "Me," "Carnac," "Flash Antics," and "Rate a Party." The app may be equipped with additional features, for example, a "Safety" feature by which a user can send messages to friends, such as a request for a friend to meet or accompany them, in which case the app enables the other users to track the physical location of the user in response to receiving the message and the user can alert the other users in the case of an emergency. A user may utilize such a feature to have the app send a message to a friend to hang with them (e.g., on a trip, etc, such as if the user is stuck somewhere alone, needs a watchful eye to get home safe) via the feature, and the user may use a "Panic" button of the feature to signal other users close to the user to come and help. As with apps and touch-screen displays commonly associated with mobile devices, these features preferably appear as icons or buttons (hereinafter, buttons) on the display and a user selects or activates a feature, for example, by pressing, touching or swiping its corresponding button, causing a different image ("screen") to be displayed (opened) on the display of the mobile device.

FIGS. 2 through 14 provide nonlimiting examples of screens displayed by accessing the features of the tool represented in FIG. 1, or otherwise accessing a location-based augmented reality feature of the tool.

Figure 2:
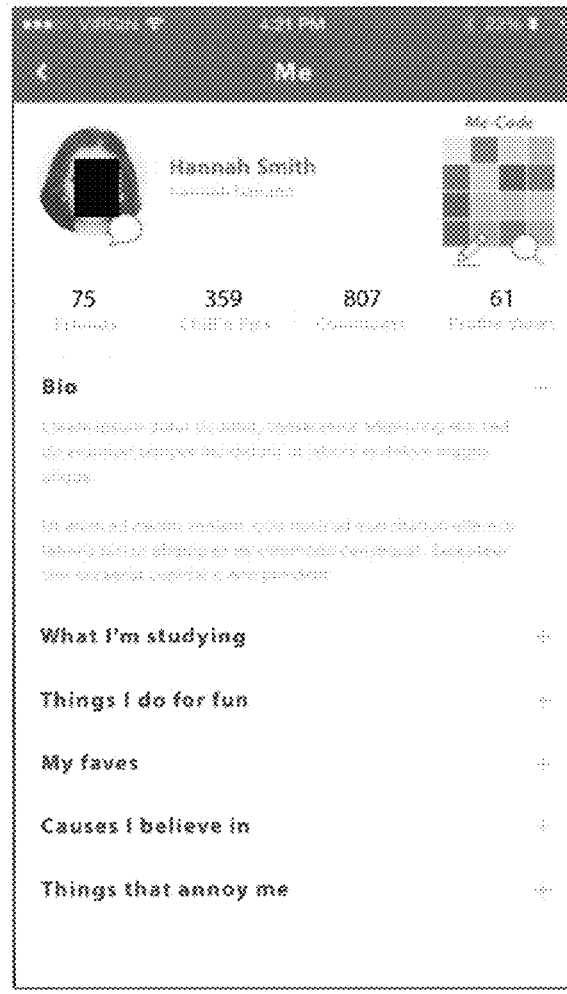
FIG. 2 represents user content created by a user of the app and displayed on the mobile device of FIG. 1 in accordance with a nonlimiting embodiment of the invention.

FIG. 2 represents the "Me" feature with which a user creates a personal profile as part of the user's user content stored in the memory of their mobile device. The screen displayed in FIG. 2 is indicative of what may be shown on the display of the mobile device of the user that created the personal profile, and represents the type of user content that the user (as a recipient user) may allow other users (initiating users) to access, depending on the privacy settings chosen by the recipient user. In a particular nonlimiting embodiment, the "Me" feature shows the recipient user's username if they are not acquainted with the initiating user, and shows the recipient user's real name if the recipient user has already included the initiating user in their group of friends on the app. From this screen, the initiating user can send a friend request to the recipient user. The recipient user can then accept or refuse the friend request after reviewing the user content of the initiating user.

Figure 3:
FIG. 3 represents the display of the mobile device of FIG. 1 showing an image "pinned" to a geographic location by a user of the app and viewable by other users of the app via a location-based augmented reality feature of the app that overlays the pinned image onto an image of the geographical location captured by a camera of the mobile device in accordance with a nonlimiting embodiment of the invention.

FIG. 3 represents the "Spot Selfie" feature which allows a user to create a pinned image from an image of themself, which the user can then pin to a geographic location using the location-based augmented reality feature of the tool, thereby creating a pinned location so that the pinned image can be accessed by other users in the physical vicinity of the pinned location. A user can insert and overlay their digital self into the real world. In one aspect, a user can secure their spot on campus to be their GPS located crib (to upload their photos, videos, bio . . . whatever). The screen displayed in FIG. 3 is indicative of what may be shown on the display of the mobile device of an initiating user that has used their camera to scan the pinned location, and shows the pinned image overlaid on an image of the real world captured by the camera. In the image of the real world in FIG. 3, the user that pinned the image of themself is not physically present. The displayed pinned image constitutes what a recipient user may allow other users (initiating users) to see, depending on the privacy settings chosen by the recipient user. As with FIG. 2, the recipient user's real name or username is shown depending on whether they are already friends with the initiating user.

Figure 4:
FIG. 4 represents the display of the mobile device of FIG. 1 showing user content provided by a user of the app that becomes accessible by other users of the app upon viewing the image of FIG. 3 with the location-based augmented reality feature. Viewers can rate the image.

FIG. 4 represents additional information as part of a recipient user's user content that can be accessed by other users (initiating users) after acquiring the pinned image of FIG. 3 on their mobile devices. The screen displayed in FIG. 4 is indicative of the user content of a recipient user that created the pinned image seen in FIG. 3 (and is visible in the upper lefthand corner of FIG. 4), and that the recipient user may allow other users (initiating users) to see, depending on the privacy settings chosen by the recipient user. Optionally, initiating users are able to rate and/or comment on the pinned image. As with FIGS. 2 and 3, the recipient user's real name or username is shown depending on whether they are already friends with the initiating user, and may accept or refuse a friend request of the initiating user after reviewing the user content of the initiating user.

Figure 5:
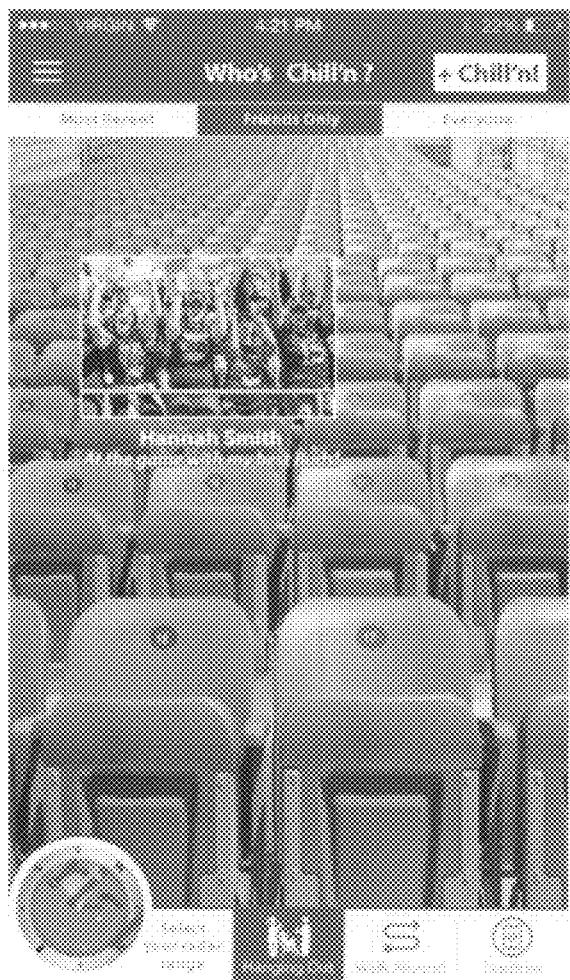
FIG. 5 represents the display of the mobile device of FIG. 1 showing an image provided by a user of the app and relating to a past social gathering, pinned to a geographic location by the user, and viewable by other users of the app via a location-based augmented reality feature that overlays the pinned image onto an image of the geographical location captured by a camera of the mobile device in accordance with a nonlimiting embodiment of the invention.

FIG. 5 represents the "Chill'n Post" feature which allows a user to create a pinned image from an image of a past or present social gathering, which the user can then pin to a geographic location using the location-based augmented reality feature of the tool, thereby creating a pinned location so that the pinned image can be accessed by other users in the physical vicinity of the pinned location. The screen displayed in FIG. 5 is indicative of what may be shown on the display of the mobile device of an initiating user that has used their camera to scan the pinned location, and shows the pinned image overlaid on an image of the real world captured by the camera. The displayed pinned image constitutes what a recipient user may allow other users (initiating users) to see, depending on the privacy settings chosen by the recipient user. As with FIGS. 2 through 4, the recipient user's real name or username is shown depending on whether they are already friends with the initiating user, and may accept or refuse a friend request of the initiating user after reviewing the user content of the initiating user.

Figure 6:
FIG. 6 represents the display of the mobile device of FIG. 1 showing user content provided by a user of the app that becomes accessible by other users of the app upon viewing the image of FIG. 5 with the location-based augmented reality feature. Viewers can comment and/or rate the image.

FIG. 6 represents additional information as part of a recipient user's user content that can be accessed by other users (initiating users) after acquiring the pinned image of FIG. 5 on their mobile devices. The screen displayed in FIG. 6 is indicative of the user content of a recipient user that created the pinned image of FIG. 5 (and also visible in FIG. 6), and that the recipient user may allow other users (initiating users) to see, depending on the privacy settings chosen by the recipient user. Optionally, initiating users are able to rate and/or comment on the pinned image. As before, the recipient user's real name or username is shown depending on whether they are already friends with the initiating user, and may accept or refuse a friend request of the initiating user after reviewing the user content of the initiating user.

Figure 23:
FIG. 23 illustrates another example of a first display on a mobile phone device showing a "Chill'n" post overlayed on a display of a real-world image and a second display on the mobile phone device showing a display accessible by tapping the "Chill'n" post.

FIG. 23 illustrates another example of a "Chill'n Post" feature. FIG. 23 shows two representations of a mobile phone device in front of an environment of a sports facility. A display on the first mobile phone representation includes a display of a "Chill'n" post (i.e., a rectangle image representation showing an image of multiple people) overlayed over an image of the surroundings of the sports facility. In one exemplary aspect, a user of a mobile phone device may scan their surroundings for "Chill'n" posts or can post their own "Chill'n" post. A display on the second mobile phone representation includes a display accessed by tapping on the displayed "Chill'n" post in the prior display. In this second display, the user can comment or rate the chill factor of the "Chill'n" post. The display shows a larger representation of the image from the "Chill'n" post along with a listing of comments from other users therebelow. In one exemplary aspect, a user can overlay a pic of their gathering right where it just happened in the real-world and their friends can stop by anytime to comment and rate the chill factor (weeks later, that same pic or video stays hanging in midair waiting for more friends to check it out).

Figure 7:
FIG. 7 represents the display of the mobile device of FIG. 1 showing an image captured by a camera of the mobile device, in which users of the app are identified with the location-based augmented reality feature in accordance with a nonlimiting embodiment of the invention.

The "Carnac" feature is similar to the "Spot Selfie" and "Chill'n Post" features, except that by scanning a geographic area with the camera of their mobile device, an initiating user is able to detect the actual physical presence of other users of the app. As previously noted, the location-based augmented reality feature of the app indicates the presence of other users of the app on the display of the initiating user's mobile device, for example, as a result of the location-based augmented reality feature displaying a notification, such as profile pictures of the other users as shown in FIG. 7, though other means of notification are also within the scope of the invention. Whether a notification of a particular recipient user appears on the display of an initiating user will depend on the privacy settings chosen by that recipient user. Thereafter, the initiating user can use their mobile device to access the recipient user's user content, for example, by tapping on the profile picture of the user(s) of interest to the initiating user.

The pinned images and user content displayed and represented in FIGS. 2 through 7 may be stored locally in the memory of the recipient user's mobile device, stored remotely on a server of the mobile network, or a combination of both.

As evident from the above, the above features of the tool allow initiating users to access the user content of recipient users with the location-based augmented reality feature of the tool. In FIG. 3, an image of a user is superimposed over a physical, real-world environment as viewed through an imaging device (for example, a camera) on another user's cellular (smart) phone (or other handheld electronic mobile device). Similarly, in FIG. 5 an image of a group of individuals is superimposed over a physical location near where the image was originally generated, as viewed by another user at a later time. In each case, the user has pinned the images to their respective geographic locations, which are stored and identifiable on the basis of their unique geographic (e.g., GPS) coordinates as detected by the location device (e.g., GPS receiver) of the user's mobile device. Preferably, a user may access information about a second user by viewing the second user through a display of the first user's mobile device. If the second user has a mobile device running the app, the first user may be provided access to the second user's information as a result of the augmented reality feature displaying a pinned image of the second user on the first user's mobile device.

Since various features of the app (for example, the Spot Selfie and Chill'n Post features) provide for pinning an image or other user content (collectively, "pinned user content") accessible by other users in a geographic location, the app provides means for users (initiating users) to locate pinned user content of other users (recipient users). For example, the app may include means for identifying on a map the specific geographic location of all available user content that has been pinned and/or specific filtered user content. As a nonlimiting but more specific example, the app may provide a search (radar) feature that presents a map to an initiating user with locations of pinned user content of potential recipient users highlighted on the map, for example, using the GPS coordinates of the pinned user content, relative to the location of the initiating user (for example, over an area encompassing a predetermined distance around the initiating user, as set by the initiating user). The search feature may include filter options to limit the highlighted user content, for example, based on distance or category/type of user content. For example, the app may include filter options including "hanging out" which includes only pinned user content that is relatively near the physical location of the initiating user, "walking around" which includes a larger geographic area than "hanging out," and "stadium" which includes all available pinned user content regardless of location.

Referring again to FIG. 2, a recipient user's information displayed on an initiating user's mobile device may include a visual display (labeled as "Me") that is representative of the recipient user's personality, preferences, or other information. In one exemplary aspect, a user's "Me" section acts as a standard profile, where the user may post a pic (e.g., do the duck face if that's your thing) or tell others who they are, where they are from, what makes them smile, what they are learning, what they are listening to and watching. Preferably, the visual display includes what is identified in FIG. 2 as a "Me Code," comprising a grid of various colors with each color representing a trait, preference, intention, etc. of the recipient user. As such, the colors of the visual display may be unique to the individual recipient user. As a nonlimiting example, the visual display may be generated as a result of the recipient user having previously answered a series of questions, such that each color in the grid corresponds to one of the questions, and the shade of each color indicates the answer given by the recipient user to the corresponding question. Preferably, the visual display is accessible by other users (initiating users) in order to provide a quick summary of the recipient user's traits, preferences, intentions, etc. A Me-Code can also be used to search people based on what personality types a user is looking for (e.g., a user can use a Me-Code to create a personality and then start a conversation with the searched for other user). Additional nonlimiting information regarding steps taken by a user to create their Me-Code is provided in FIGS. 8 through 14.

FIGS. 15 to 21 illustrate another example of user interfaces for building a personality within a platform. In this example, a Me-Code is built based on a plurality of questions (e.g., the sixteen questions listed below) from a plurality of categories (e.g., the four categories listed below). The four categories in this example are a personality category, a social category, a physical category, and an activities category. In the personality category of this example, there are four questions: a life satisfaction question with six possible answers (life sucks, goth, emo, always searching, got everything I want, and happy, which are associated with colors: fdfced, fdfdc3, fefd92, fefe5f, fffe30, and ffff03); an emotional baggage question with six possible answers (free and clear, I'm mellow, small carry-on, everyone has baggage, enough issues for a magazine rack, and none of your business, which are associated with colors: fff6eb, ffe7c6, ffd091, ffbb60, ffa732, and ff9404); an adventurousness question with six possible answers (sloth, chill, ain't nobody got time for that, talk me into it, let's do this, and Cowabunga!!, which are associated with colors: fdf7f0, fdd9c1, fdbd93, fe9e5f, fe8331, and ff6b09); and an ambition question with six possible answers (Zzzz Zzzz, not leaving this couch, meh, follower, follow me!, and world domination, which are associated with colors: faefe7, e8cfbc, d5ab8e, c0875e, af6835, and 9b4407).

In the social category in this example, there are four questions: a looking for love? question with six possible answers (meh, open to whatever happens, want it eventually, want it NOW, already got it, and marry me!, which are associated with colors: fdeaea, fdc8c9, fd999b, fc696b, fc3538, and fc070b); a looking for sex? question with six possible answers (nun, waiting for the right one, waiting till after I'm married, maybe when I know you better, I'll be right over baby, and DTF, which are associated with colors: fdid5, f0b0b5, e68890, db606b, d03341, and c30515); a political spirit animal question with six possible answers (Ronald Reagan, Donald Trump, John F. Kennedy, Hilary Clinton, nonpartisan, and could care less, which are associated with colors: fce0eb, fcc1d8, fc92bb, fd619e, fd3583, and fd0264); and a party much? question with six possible answers (I socialize sober, always the babysitter of the group, only on the weekends, party every day, I'm partying now, and functioning alcoholic, which are associated with colors: e0ccdc, daabd1, d284c4, ca5ab5, c436a9, and bb0a9a).

In the physical category in this example, there are four questions: a body type question with six possible answers for women (pixie, ballerina, normal, are those real?, athletic, and big and proud, which are associated with colors d2cada, bcaad0, a48bc4, 875cb7, 6d35ab, and 520c9e) and six possible answers for men (jockey, beanpole, normal, lumberjack, dadbod, and sumo, which are associated with colors d2cada, bcaad0, a48bc4, 875cb7, 6d35ab, and 520c9e); a tatt factor question with six possible answers (baby clean, small and tasteful, only in hidden spots, always adding, inked up, and circus freak, which are associated with colors d9e1f9, b9c6f2, 91abe9, 6380df, 385dd6, and 0432cb); a sports much? question with six possible answers (not my thing, spectator, couch coach, play for funsies, serious jock, and Olympic level, which are associated with colors e0eef7, bfe2f7, 8fd0f7, 61bff8, 33aef8, and 079ef8); and a sexuality question with six possible answers (straight and narrow, straight but maybe on a dare . . . , bi, queer, still trying to figure it out, and don't ask, which are associated with colors d4fcf9, b8f5f1, 8debe4, 5ee0d6, 2fd5c8, and 08ccbc).

In the activities category in this example, there are four questions: an environment question with six possible answers (drill baby drill!, don't really think about it, I try, recycler, vegetarian in a Prius, and vegan on a bike, which are associated with colors: d1fad1, b6f1b7, 89e28a, 60d460, 33c534, and 08b709); a charity work question with six possible answers (too busy with my own problems, ain't nobody got time for that, when someone needs me, every now and then, superhero volunteer, and Mother Teresa, which are associated with colors f4ffe2, e7fcc6, d2f896, bcf465, a9f139, and 92ec05); a gamer? question with six possible answers (never, don't own a gaming system, only with friends, occasionally, hardcore, and gamer4life, which are associated with colors fcead8, f2d8be, e5c19f, d9ac81, cd9763, and c28448); and a study much question with six possible answers (these books are really getting in the way of my "me" time, whatevs, 6-year plan, getting it done, studying now, and eyes on the prize, which are associated with colors eae9e9, d0cfcf, b5b5b5, 969696, 767575, and 595959).

Figure 15:
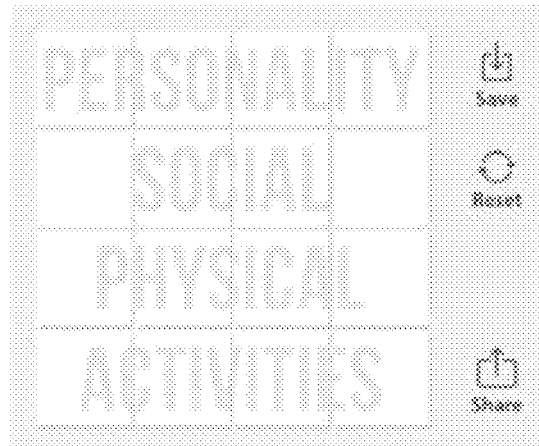
Figure 16:
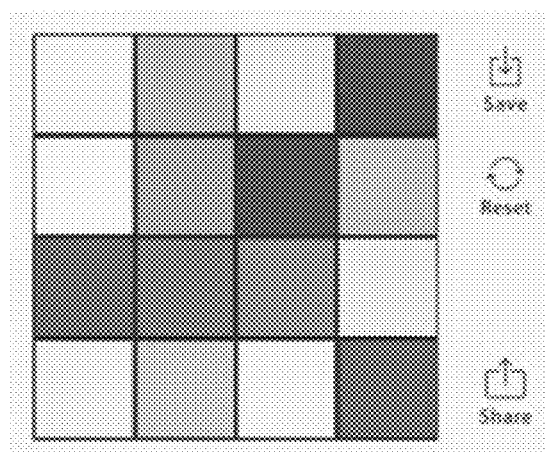
Figure 17:
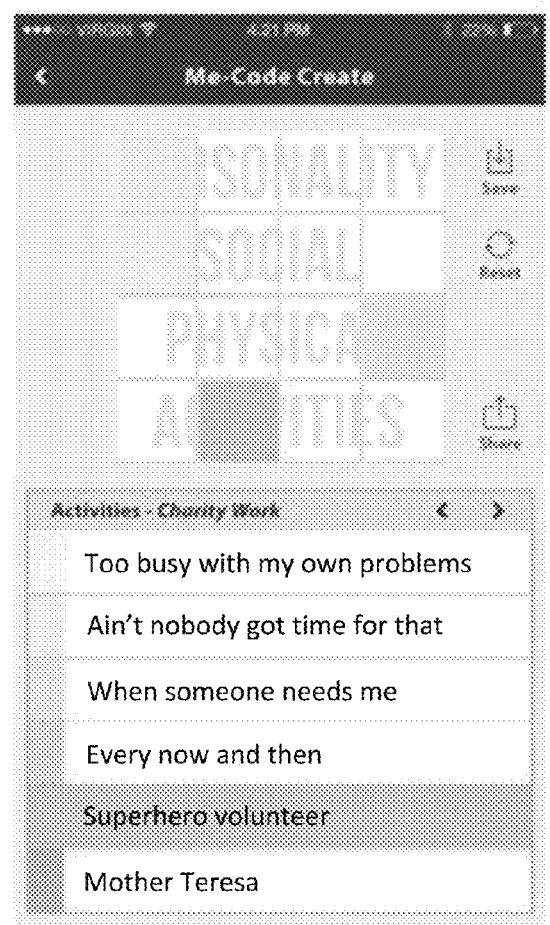

FIG. 15 illustrates an example graphical display for building a "Me-Code" represented as a grid including sixteen squares arranged in a four-by-four arrangement, the square regions each corresponding to one of the sixteen questions in this example from the four categories. The top four square regions are displayed with the wording "PERSONALITY" representing the personality category of questions, the next four square regions are displayed with the wording "SOCIAL" representing the social category of questions, the next four square regions are displayed with the wording "PHYSICAL" representing a physical category of questions, and the next four square regions are displayed with the wording "ACTIVITIES" representing an activities category of questions. FIG. 16 illustrates a "Me-Code" graphical display with a shade of color in each square region (similar to the fully completed "Me-Code" graphical display in the example of FIG. 14). FIG. 17 illustrates a partially completed "Me-Code" graphical display (similar to the example display of FIG. 13) with one question/square from each category completed/filled in with a shade of color. The user interface displayed in FIG. 17 also illustrates a section displaying six possible answers to a charity work question in the activities category with the fifth answer ("superhero volunteer") highlighted in the color shade also shown in the corresponding square region in the "Me-Code" graphic above the answers. FIGS. 18 to 21 illustrate four similar question and answer display sections. FIG. 18 illustrates a display section for an emotional baggage question from the personality category along with the fifth answer ("enough issues for a magazine rack") highlighted in a color shade matching the corresponding square region shown in FIGS. 17 and 16. FIG. 19 illustrates a display section for a looking for sex question of the social category with the third answer ("waiting till after I'm married") highlighted in a color shade matching the corresponding square region shown in FIGS. 17 and 16. FIG. 20 illustrates a display section for a body type question of the physical category with the fourth answer ("are those real?") highlighted in a color shade matching the corresponding square region shown in FIGS. 17 and 16. FIG. 21 illustrates a larger perspective view of the display section shown in FIG. 17 for the "charity work" question.

Finally, the app may provide additional features such as the aforementioned "Safety," "Flash Antics," and "Rate a Party" features. As an example, the Flash Antics feature may provide means by which a plurality of users in a vicinity of a geographic location are able to vote on an activity to be performed by the users at the geographic location, and the Rate a Party feature may provide means for labeling a geographic location (e.g., dropping a GPS-assisted notice) where a social gathering is currently occurring, and rate the social gathering for viewing by other users.

In view of the above, the app provides various functions for selectively providing an initiating user with social media-related information about other users with whom they may or may not be acquainted and who are in their physical vicinity in order to promote direct person-to-person communications and social interactions. For example, in the case of two users that are within a sufficiently small geographic area that enables a first of the users to see the other, the first user may decide they would like to know more about the second user. The first user may then, in the role of the initiating user, use the app in an attempt to access information about the other user, who is now in the role of a recipient user. Because the other person is also a user with user content that includes a personal profile that they created in the app, the initiating user may be provided with information about the recipient user contained in the personal profile of the recipient user. The information available to the initiating user can be limited or even prevented by the recipient user's privacy settings. For example, as represented in FIG. 2, the initiating user may be provided access to information such as the recipient user's name, picture, interests, hobbies, etc., as part of their personal profile. As shown in FIG. 2, the initiating user is provided with the recipient user's Me-Code, and by interpreting the colors within the Me-Code, will be informed of the recipient user's general personality, interests, etc. Such information is intended to inform users of whether other users within their vicinity share common interests, and to otherwise promote direct person-to-person communications and social interactions. The app can also enable an initiating user to search other users (for example, those displayed with the Carnac feature) based on a percentage match to the initiating user's Me-Code as calculated by the app. Such a capability can generate a list of users that can then be reviewed by the initiating user, who can then send a friend request to those users with whom the initiating user wishes to become friends.

In addition to promoting direct person-to-person communications and social interactions between unacquainted individuals, the personal information and location of the users provides a mutually beneficial marketing opportunity. In particular, the app preferably is capable of identifying businesses, products, events, etc., that may be relevant to an individual user based on the user's personality, interests, activities, etc., as indicated by the contents of their personal profile. Based on this information, the app may then provide advertisements to the user based on the user's preferences and the user's actual (GPS) location. The advertisements are effectively customized customer electronic billboards, which the app may show as virtual objects floating in the augmented reality space displayed by the camera of the user's mobile device. The user can then tap the billboard to obtain more information about the advertised product. In an example, a logo and products can be overlayed in the real-world, at the most popular spots on campus, inside or out (e.g., at special events, on the walking paths, in the cafeteria, even on the football field during the biggest game of the year, anytime, anyplace). In addition, the app may provide feedback regarding the user's response to the advertisements. For example, a platform may include metrics (e.g., which ads are students engaging with and for how long?, was the ad forwarded to a friend?, did a user tap on a coupon?, metrics identifying a trend, metrics that reward loyal customers).

In one aspect, a brand may be empowered with augmented reality features such as 3D models, videos and transparent video, images, and the organic growth ability of social media can be utilized to create a true immersed marketing campaign.

In another aspect, augmented reality allows a user to see dynamic, computer-generated 3D models "hovering" in the real-world (e.g., anything, from a 6-foot-tall beverage drink, to a full-size race car). The 3D models may move and make sounds with a simple tap or triggered by a GPS located boundary.

Figure 22:
FIG. 22 illustrates an example of a display on a mobile phone device showing an image of a beverage can overlayed on a display of a real-world image.

FIG. 22 illustrates an example of user interface display (with similar display elements and buttons to the example "Who's Chill'n" displays of FIG. 5 and FIG. 23). The user interface display is shown on a mobile device positioned in front of a representation of the real-world including a fountain and buildings. The user interface display includes a virtual object of an "Energy" beverage can hovering as an overlay over an image of the real-world fountain and buildings.

The following example embodiments are also contemplated. In one embodiment, a social media system includes a means for a plurality of individuals to communicate through a location based augmented reality feature. In one example of this embodiment, the social media system also includes a means for a first individual to attach user-generated information to a specific geographic location; and means for providing access to the user-generated information to a second individual through the location based augmented reality feature. In another example of this embodiment, the social media system also includes means for a first individual to attach user-generated information to a specific geographic location, the user-generated information relating to a social gathering and providing a list of participants attending the social gathering; means for providing access to the user-generated information to a second individual through the location based augmented reality feature; and means for the second individual to join the list of participants of the social gathering. In yet another example of this embodiment, the social media system also includes means for a first individual to attach user-generated information to a specific geographic location; and means for providing access to the user-generated information to a second individual through the location based augmented reality feature; and means for identifying on a map the specific geographic location of the user-generated information. In still another example, any one of the embodiment or above examples further includes means for a plurality of individuals in a vicinity of a geographic location to vote on an activity to be performed by the plurality of individuals at the geographic location. In still yet another example, any one of the embodiment or above examples also further includes means for a first individual to create a personal profile comprising personal information specific to the first individual; and means for providing access to at least some of the personal information in the personal profile to a second individual. Personal information may include a visual display comprising a grid of colors generated by having the first individual answer predetermined questions, each of the colors in the grid representing an answer to one of the questions and having a shade that corresponds to an answer to the corresponding one of the questions. In still a further example, any one of the embodiment or above examples also includes means for identifying an individual with the location based augmented reality feature; and means for accessing personal information about the individual. In yet a further example, any one of the embodiment or above examples also includes means for labeling a geographic location where a social gathering is currently occurring; and means for rating the social gathering. In still yet a further example, any one of the embodiment or above examples also includes means for a first individual to provide a message to other individuals physically near the first individual; means for the other individuals to track the physical location of the first individual in response to receiving the message; and means for the first individual to alert the other individuals in the case of an emergency.

In another embodiment, a method includes providing for a plurality of individuals to communicate through a location based augmented reality feature. In one example of this embodiment, the method further includes attaching user-generated information created by a first individual to a specific geographic location; and providing access to the user-generated information to a second individual through the location based augmented reality feature. In another example of this embodiment, the method further includes attaching user-generated information created by a first individual to a specific geographic location, the user-generated information relating to a social gathering and providing a list of participants attending the social gathering; providing access to the user-generated information to a second individual through the location based augmented reality feature; and adding the second individual the list of participants of the social gathering. In still another example of this embodiment, the method further includes attaching user-generated information created by a first individual to a specific geographic location; and providing access to the user-generated information to a second individual through the location based augmented reality feature; and identifying on a map the specific geographic location of the user-generated information. In yet another example, any one of the embodiment or above examples also further includes providing a plurality of individuals in a vicinity of a geographic location the capability to vote on an activity to be performed by the plurality of individuals at the geographic location. In still yet another example, any one of the embodiment or above examples also further includes creating a personal profile comprising personal information specific to a first individual; and providing access to at least some of the personal information in the personal profile to a second individual. A method that includes creating a personal profile as in the previous example may also include asking the first individual predetermined questions; and then generating a visual display comprising a grid of colors with each of the colors in the grid representing an answer to one of the questions and having a shade that corresponds to an answer to the corresponding one of the questions. In a further example, any one of the embodiment or above examples also further includes identifying a first individual with the location based augmented reality feature; and providing personal information about the first individual to a second individual. In still a further example, any one of the embodiment or above examples also further includes labeling a geographic location where a social gathering is currently occurring; and providing for individuals to rate the social gathering. In yet a further example, any one of the embodiment or above examples also further includes providing a message to other individuals physically near a first individual; providing for the other individuals to track the physical location of the first individual in response to receiving the message; and providing for the first individual to alert the other individuals in a case of an emergency.

While the invention has been described in terms of specific or particular embodiments, it is apparent that other forms could be adopted by one skilled in the art. For example, the tool and its features could differ in appearance and construction from the embodiments described herein and shown in the drawings, and the tool may operate on devices other than those described herein. Accordingly, it should be understood that the invention is not limited to any embodiment described herein or illustrated in the drawings. It should also be understood that the phraseology and terminology employed above are for the purpose of describing the disclosed embodiments, and do not necessarily serve as limitations to the scope of the invention. Therefore, the scope of the invention is to be limited only by the following claims.

The invention claimed is:

1. A method of interacting in a social media platform, the method comprising:
receiving from a first user of a social media platform a pinning of a first image of the first user's digital self to a first geographic location via a first user interface displayed to the first user on a first mobile device;
securing a spot of an area near the pinning of the first image as a GPS located crib for the first user;
receiving from the first user a pinning of a second image representing other non-personal profile user-generated content of the first user to the GPS located crib; and
providing a second user interface to a second user of the social media platform when the second user is physically located at the first geographic location, the second user interface including an augmented reality display of the first image and the second image each superimposed over an image of a real-world environment of the first geographic location, the image of the real-world environment obtained via a camera of a second mobile device of the second user, the first image and the second image being accessible by the second user only when the second user is within the physical vicinity of the first geographic location, the display of the first image providing access to the second user to a personal profile of the first user, the display of the second image providing access to the second user to a separate display of the user-generated content represented by the second image.

2. A method according to claim 1, further comprising allowing the second user to access the personal profile of the first user.

3. A method according to claim 2, wherein the display of the user profile includes an ability for the second user to rate the first image of the first user's digital self.

4. A method according to claim 1, further comprising allowing the second user to access the separate display of the user-generated content represented by the second image.

5. A method according to claim 4, wherein the additional display of the user-generated content includes an ability for the second user to rate and/or comment on the user-generated content.

6. A method according to claim 1, wherein the first image of the first user's digital self includes an image of the first user.

7. A method according to claim 6, wherein the image is a full-length image of the first user.

8. A method according to claim 1, wherein the display of the first image of the first user's digital self includes an indication of a username of the first user.

9. A method according to claim 1, wherein the display of the first image of the first user's digital self includes an indication of the real name of the first user.

10. A method according to claim 1, wherein the second image is an image representing a past or present social gathering at the first geographic location.

11. A method according to claim 1, wherein the second image is an image representing a group of individuals.

12. A method according to claim 1, wherein the first and second users are members of a university and the first geographic location is a location on a university campus.

13. A method according to claim 1, wherein the display of the first image and the second image to the second user is allowed based on a privacy setting of the first user.

14. A method according to claim 1, wherein the display of the first image and the second image to the second user is based on a filter setting of the second user.

15. A method according to claim 1, wherein the display of the first image and the second image to the second user is allowed based on a matching of a representation of the first user's personality to a representation of the second user's personality.

16. A method of interacting in a social media platform, the method comprising:
receiving from a first user of a social media platform a pinning of a first image of the first user's digital self to a first geographic location via a first user interface displayed to the first user on a first mobile device;
securing a spot of an area near the pinning of the first image as a GPS located crib for the first user;
receiving from the first user a pinning of a second image representing other non-personal profile user-generated content of the first user to the GPS located crib; and
providing a second user interface to a second user of the social media platform when the second user is physically located at the first geographic location, the second user interface including an augmented reality display of the first image and the second image each superimposed over an image of a real-world environment of the first geographic location, the image of the real-world environment obtained via a camera of a second mobile device of the second user, the first image and the second image being accessible by the second user only when the second user is within the physical vicinity of the first geographic location, the display of the first image providing access to the second user to a personal profile of the first user, the display of the second image providing access to the second user to a separate display of the user-generated content represented by the second image, wherein the display of the first image and the second image to the second user is allowed based on a matching of a representation of the first user's personality to a representation of the second user's personality.

17. A method according to claim 16, wherein the display of the first image and the second image to the second user is allowed based on a privacy setting of the first user.

18. A method according to claim 16, wherein the display of the first image and the second image to the second user is based on a filter setting of the second user.

19. A method of interacting in a social media platform, the method comprising:
receiving from a first user of a social media platform a pinning of a first image of the first user's digital self to a first geographic location via a first user interface displayed to the first user on a first mobile device, wherein the first user is a member of a university and the first geographic location is on a university campus;
securing a spot of an area near the pinning of the first image as a GPS located crib on campus for the first user;
receiving from the first user a pinning of a second image representing other non-personal profile user-generated content of the first user to the GPS located crib;
providing a second user interface to a second user of the social media platform when the second user is physically located at the first geographic location, the second user interface including an augmented reality display of the first image and the second image each superimposed over an image of a real-world environment of the first geographic location, the image of the real-world environment obtained via a camera of a second mobile device of the second user, the first image and the second image being accessible by the second user only when the second user is within the physical vicinity of the first geographic location, the display of the first image providing access to the second user to a personal profile of the first user, the display of the second image providing access to the second user to a separate display of the user-generated content represented by the second image, wherein the display of the first image and the second image to the second user is allowed based on a matching of a representation of the first user's personality to a representation of the second user's personality;
allowing the second user to access the personal profile of the first user; and
allowing the second user to access the separate display of the user-generated content represented by the second image.

20. A method according to claim 16, further comprising allowing the second user to access the personal profile of the first user.

21. A method according to claim 20, wherein the display of the user profile includes an ability for the second user to rate the first image of the first user's digital self.

22. A method according to claim 16, further comprising allowing the second user to access the separate display of the user-generated content represented by the second image.

23. A method according to claim 22, wherein the additional display of the user-generated content includes an ability for the second user to rate and/or comment on the user-generated content.

24. A method according to claim 16, wherein the first image of the first user's digital self includes an image of the first user.

25. A method according to claim 24, wherein the image is a full-length image of the first user.

26. A method according to claim 16, wherein the display of the first image of the first user's digital self includes an indication of a username of the first user.

27. A method according to claim 16, wherein the display of the first image of the first user's digital self includes an indication of the real name of the first user.

28. A method according to claim 16, wherein the second image is an image representing a past or present social gathering at the first geographic location.

29. A method according to claim 16, wherein the second image is an image representing a group of individuals.

30. A method according to claim 16, wherein the first and second users are members of a university and the first geographic location is a location on a university campus.

31. A method according to claim 19, wherein the display of the user profile includes an ability for the second user to rate the first image of the first user's digital self.

32. A method according to claim 19, wherein the additional display of the user-generated content includes an ability for the second user to rate and/or comment on the user-generated content.

33. A method according to claim 19, wherein the first image of the first user's digital self includes an image of the first user.

34. A method according to claim 33, wherein the image is a full-length image of the first user.

35. A method according to claim 19, wherein the display of the first image of the first user's digital self includes an indication of a username of the first user.

36. A method according to claim 19, wherein the display of the first image of the first user's digital self includes an indication of the real name of the first user.

37. A method according to claim 19, wherein the second image is an image representing a past or present social gathering at the first geographic location.

38. A method according to claim 19, wherein the second image is an image representing a group of individuals.

39. A method according to claim 19, wherein the first and second users are members of a university and the first geographic location is a location on a university campus.

40. A method according to claim 19, wherein the display of the first image and the second image to the second user is allowed based on a privacy setting of the first user.

41. A method according to claim 19, wherein the display of the first image and the second image to the second user is based on a filter setting of the second user.

* * * * *